(12) United States Patent
Zhang et al.

(10) Patent No.: US 8,875,158 B2
(45) Date of Patent: Oct. 28, 2014

(54) METHOD FOR REQUEST PROFILING IN SERVICE SYSTEMS WITH KERNEL EVENTS

(71) Applicant: NEC Laboratories America, Inc., Princeton, NJ (US)

(72) Inventors: Hui Zhang, Princeton Junction, NJ (US); Junghwan Rhee, Princeton, NJ (US); Guofei Jiang, Princeton, NJ (US); Kenji Yoshihira, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/850,531

(22) Filed: Mar. 26, 2013

(65) Prior Publication Data

US 2014/0109112 A1    Apr. 17, 2014

Related U.S. Application Data

(60) Provisional application No. 61/615,558, filed on Mar. 26, 2012.

(51) Int. Cl.
*G06F 3/00*    (2006.01)
*G06F 9/44*    (2006.01)
*G06F 9/54*    (2006.01)

(52) U.S. Cl.
CPC ..................................... *G06F 9/542* (2013.01)
USPC .......................................... 719/318; 717/128

(58) Field of Classification Search
CPC .................. H04L 43/08; G06F 17/241; G06F 2009/45579; G06F 11/0754; G06F 21/51; G06F 9/542; H04N 21/44222
See application file for complete search history.

(56) References Cited

U.S. PATENT DOCUMENTS

| | | | |
|---|---|---|---|
| 7,475,386 B1* | 1/2009 | Shapiro et al. | 717/128 |
| 2009/0320021 A1* | 12/2009 | Pan et al. | 718/100 |
| 2010/0011031 A1* | 1/2010 | Huang et al. | 719/318 |
| 2010/0180158 A1* | 7/2010 | Corry et al. | 714/38 |

\* cited by examiner

*Primary Examiner* — Tuan Dao
(74) *Attorney, Agent, or Firm* — Joseph Kolodka

(57) ABSTRACT

A method for request profiling in service systems with kernel events includes collecting kernel events traces from a target system, the kernel event traces being obtainable from individual service machines by instrumenting core kernel functions, analyzing kernel event traces for constructing end-to-end request profiling traces consisting of kernel events belonging to service processes, and categorizing request traces responsive to the analyzing with the constructing including grouping requests based on marking kernel events used in the analyzing.

16 Claims, 3 Drawing Sheets

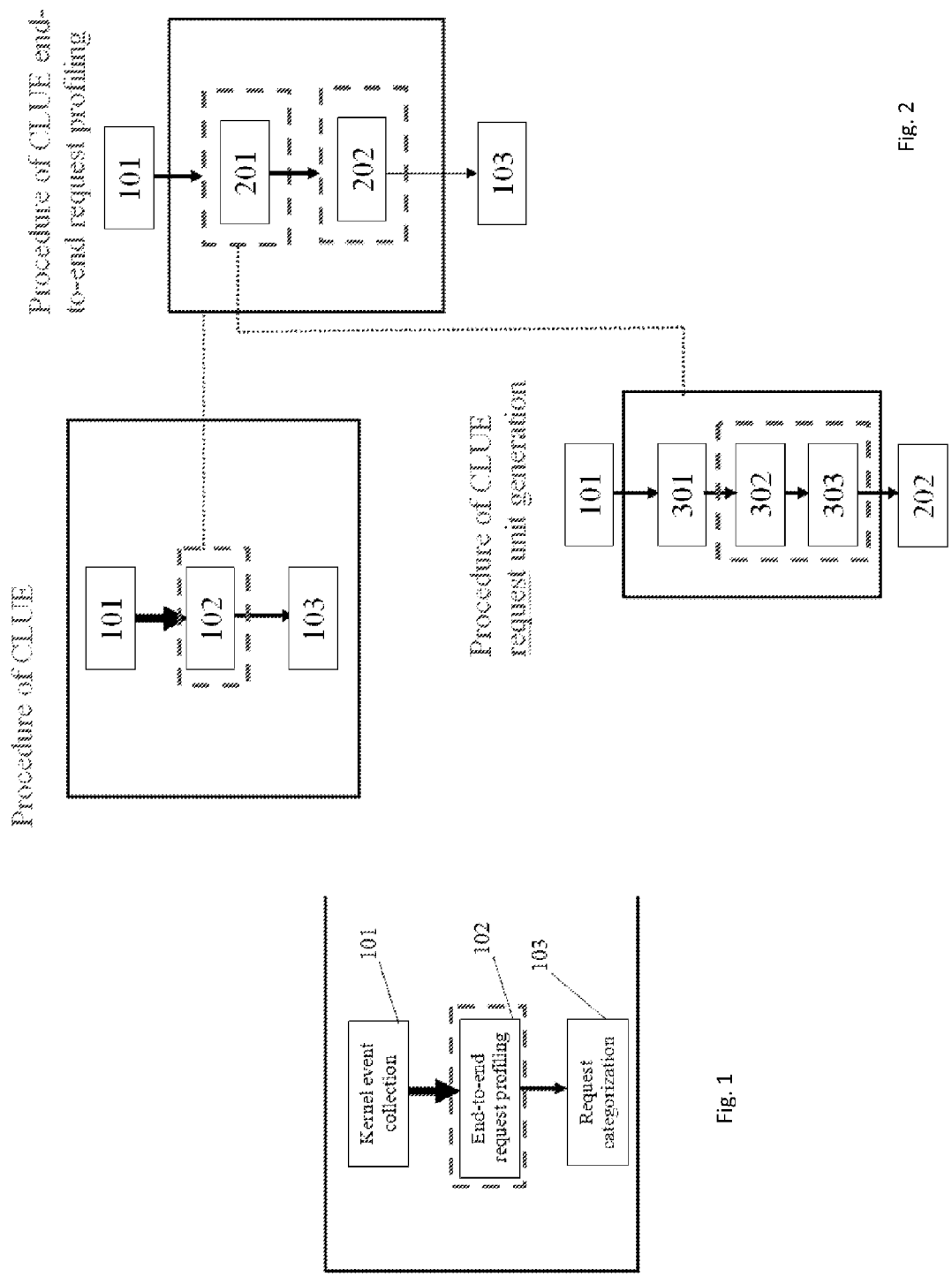

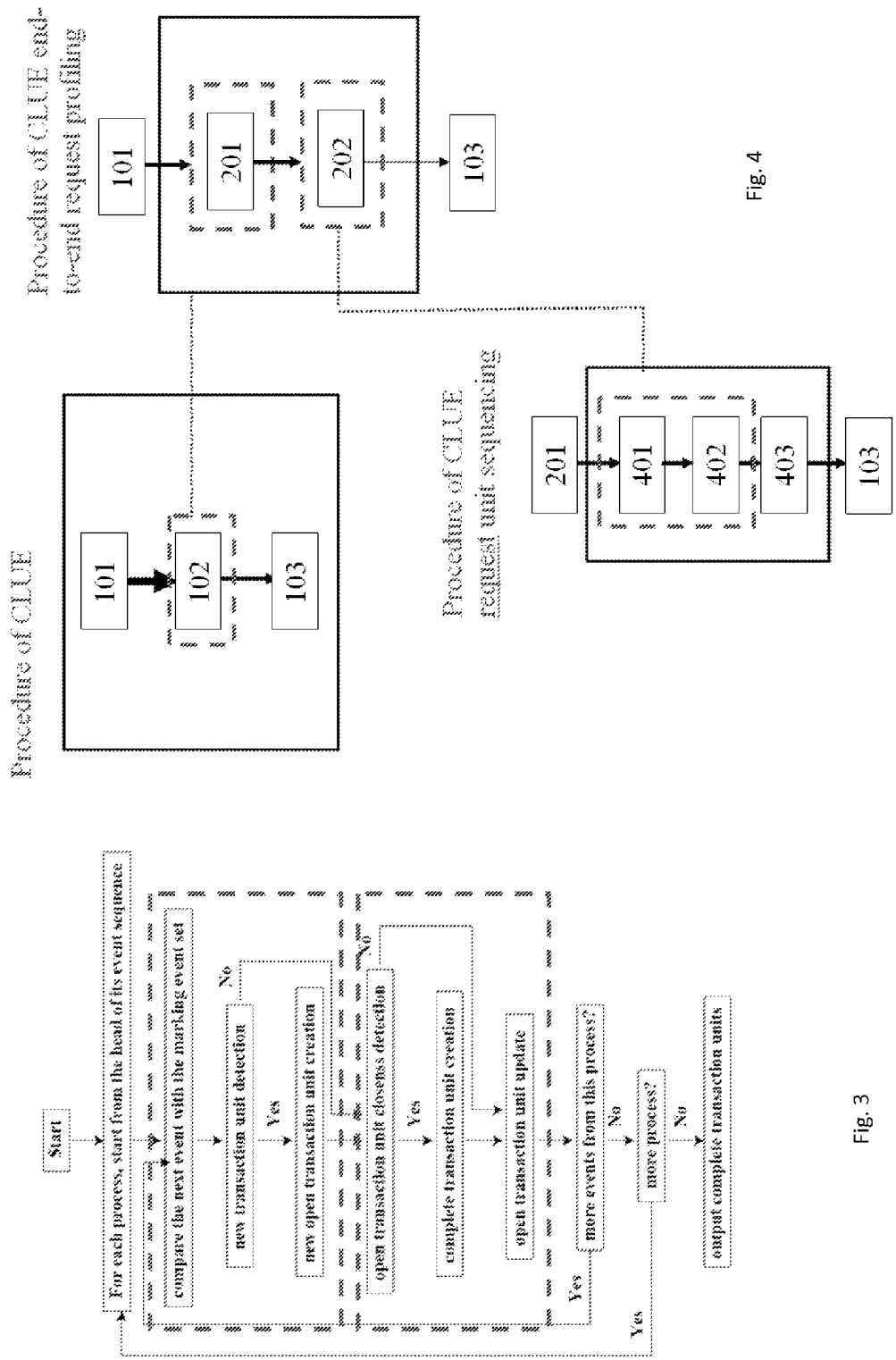

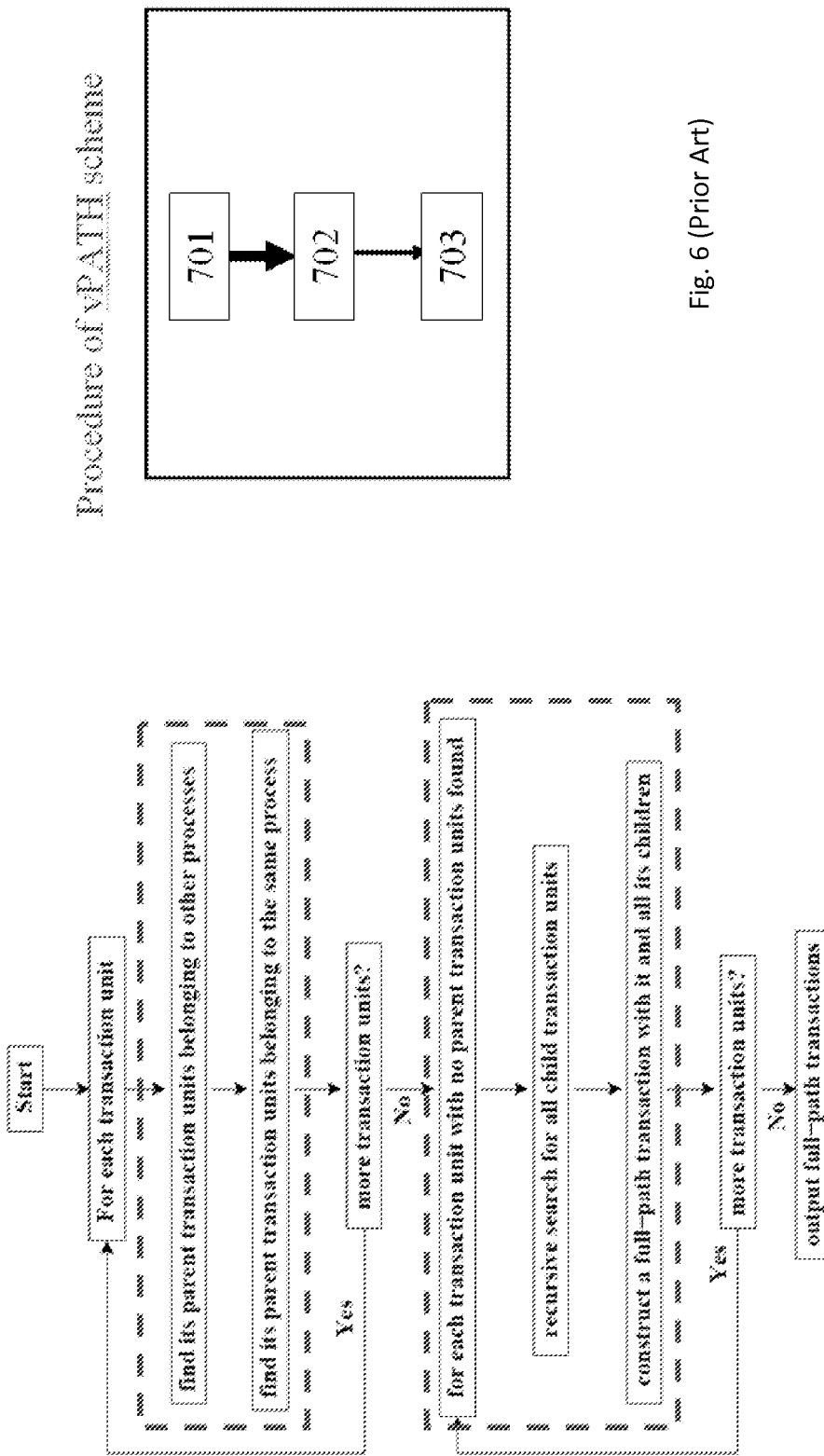

METHOD FOR REQUEST PROFILING IN SERVICE SYSTEMS WITH KERNEL EVENTS

RELATED APPLICATION INFORMATION

This application claims priority to provisional application No. 61/615,558 filed Mar. 26, 2012, the contents thereof are incorporated herein by reference

BACKGROUND OF THE INVENTION

The present invention relates generally to service systems, and more particularly, to a method for request profiling in service systems with kernel events.

Increasing software complexity and higher user expectations on service quality present a difficult challenge in multi-tier application development. When an unexpected problem occurs, predicting internal states of all relevant components is nearly impossible. Retracing the history of execution flows is cumbersome and tricky, but often necessary in finding out the root cause of software problems. The overwhelming number of hardware and software combinations, different workload characteristics, and usage patterns of end users make such tasks even tougher. A mechanism that enables understanding system execution in a transparent manner, with minimal overhead, is invaluable.

One prior effort in the area of the invention is by B. C. Tak, C. Tang, C. Zhang, S. Govindan, B. Urgaonkar, and R. N. Chang. vpath: precise discovery of request processing paths from black-box observations of thread and network activities. In Proceedings of the 2009 conference on USENIX Annual technical conference, USENIX'09, pages 19-19, Berkeley, Calif., USA, 2009. USENIX Association, hereinafter vPath.

vPath, provides precise request processing path discovery for distributed applications by monitoring thread and communication activities of components of the distributed system. vPath can precisely match thread-TCP connection information, and operates at the virtual machine monitor (VMM) layer and hence it is agnostic to the application or the middleware platform used. vPath makes assumptions about the processing model of distributed system in the log processing phase, such as synchronous communication among components of the system and a single thread handling all the messages common to one request. This makes vPath ineffective for processing models such as event driven processing model where multiple requests are handled by one thread in interleaving fashion.

Referring to FIG. 6, there is shown a flow chart of vPath request path discovery process details. In block 701, vPATH monitors context switches, intercepts all the I/O related system calls and records the virtual machine (VM) ID, content of the CR3 register and the contents of the EBP register when such activity happens. In block 702, vPath precisely matches thread-TCP connection information using the information collected in 701. In block 703, vPath constructs end-to-end request paths by composing the event traces generated during the time of the TCP connections detected in 702 and by those processes using those TCP connections.

Another prior work is by P. Barham, A. Donnelly, R. Isaacs, and R. Mortier. Using magpie for request extraction and workload modelling. In Proceedings of the 6th conference on Symposium on Operating Systems Design & Implementation—Volume 6, pages 18-18, Berkeley, Calif., USA, 2004. USENIX Association, hereinafter Magpie. .Magpie uses low overhead system instrumentation to monitor fine-grained system activities at kernel, middleware and application levels. Magpie has a request extraction component which uses application level event schema to correlate traced events and then precisely capture the control flow and resource consumption of all requests. Magpie uses a combination of Event Tracing for Windows (ETW) system to capture kernel events WinPcap packet capture library to capture network packets and post ETW events Tracepoints put in the application to capture application/middleware specific events. By removing scheduling artifacts, whilst preserving causal dependencies, they obtain canonical request descriptions from which they can construct concise workload models suitable for performance prediction and change detection.

Still another prior work, by Hasan, et al., Method and apparatus for correlating events in a network. U.S. Pat. No. 7,631,222. Dec. 8, 2009, presents an invention of "Method and apparatus for correlating events in a network". In Hasan et al. a uniquely configured data structure is used to store event information for each network entity, where logical and physical dependency relationships among entities are captured in the data structure. For each entity, the data structure is configured to store (a) a "genuine event set", which includes a list of events that originated in association with the entity; and (b) a "derived event set", which includes a list of records in which each record is associated with an event that originated in association with an entity that has a dependency relationship (e.g., layering or topological) with the entity. The derived event set may simply comprise references to the genuine event sets for entities that have a dependency relationship with the entity.

Accordingly, there is a need for request profiling in service systems with kernel events.

BRIEF SUMMARY OF THE INVENTION

The invention is directed to a method for request profiling in service systems with kernel events that includes collecting kernel events traces from a target system, the kernel event traces being obtainable from individual service machines by instrumenting core kernel functions, analyzing kernel event traces for constructing end-to-end request profiling traces consisting of kernel events belonging to service processes, and categorizing request traces responsive to the analyzing with the constructing including grouping requests based on marking kernel events used in the analyzing.

In a similar aspect of the invention there is provided a system for request profiling in service systems with kernel events that includes kernel event collection for collecting kernel events traces from a target system, the kernel event traces being obtainable from individual service machines by instrumenting core kernel functions, end-to-end request profiling for analyzing kernel event traces for constructing end-to-end request profiling traces consisting of kernel events belonging to service processes; and request categorization for categorizing request traces responsive to the end-to-end request profiling with the constructing including grouping requests based on marking kernel events used in the end-to-end request profiling.

These and other advantages of the invention will be apparent to those of ordinary skill in the art by reference to the following detailed description and the accompanying drawings.

BRIEF DESCRIPTION OF THE DRAWINGS

FIG. 1 is an exemplary flow diagram of configurable transactional profiling in production systems (hereinafter CLUE) end-to-end request profiling, in accordance with the invention;

FIG. 2 is a diagram detailing CLUE end-to-end request profiling, in accordance with the invention;

FIG. 3 is a flow diagram for CLUE request unit slicing procedure block 303 in FIG. 2, in accordance with the invention;

FIG. 4 is a diagram for CLUE request unit sequencing procedure, in accordance with the invention;

FIG. 5 is a flow diagram for CLUE request unit sequencing procedure in block 402 of FIG. 4, in accordance with the invention; and FIG. 6 is a diagram of the vPath request path discovery scheme discussed in the background of the invention

DETAILED DESCRIPTION

The present invention targets low-overhead end-to-end tracing that can capture the flow (i.e., path and timing) of individual requests within and across the components of a distributed system. End-to-end tracing offers an invaluable information source, capturing a distributed system's performance and control flow in detail. Such tracing consists of storing activity records at each of various trace points in the distributed system's software, with each such record identifying the specific trace point, the current time, and other context information.

The invention includes a method and system by which the execution traces of a request in a service system can be reconstructed with kernel event traces. Such kernel event traces can be obtained from individual service machines by instrumenting core kernel functions including system-level operating system calls, as well as by other techniques.

The invention includes defining a configurable marking event set, and a slicing algorithm transforming the collected kernel event traces into multiple trace units based on the event set. The method also includes defining the causality relationships between marking events, and a sequencing algorithm grouping together all trace units invoked by the same request based on event causality. The trace units may belong to service processes distributed over multiple machines, residing on the same machine, or sometimes belong to the same process (e.g., a series of threads executing a single request).

FIG. 1 shows the process of the invention CLUE end-to-end request profiling. At step 101, kernel event collection, the invention collects the kernel event traces from the target system. Such kernel event traces can be obtained from individual service machines by instrumenting core kernel functions including system-level operating system calls, as well as by other techniques. At step 102, end-to-end request profiling, the invention analyzes the kernel event traces, and constructs end-to-end request traces which consist of kernel events belonging to service processes distributed over multiple machines, residing on the same machine, or sometimes belong to the same process (e.g., a series of threads executing a single request). Lastly, at step 103, request categorization, the invention categorizes the requests traces output by 102. One categorization method is grouping requests based on the marking kernel events used in 102. Other categorization methods such as data mining clustering algorithms can be applied as well.

FIG. 2 shows the details of the CLUE end-to-end request profiling procedure. At step 201, request unit generation, the invention generates request units from the collected kernel events based on a configurable marking event set. At step 202, request unit sequencing, the invention constructs full-path request traces by composing relevant requests units based on the causality relationship set which is between request units and defined on the marking event set and temporal relationships.

FIG. 2 also shows the details of the CLUE request unit generation procedure as follows: at step 301, pre-process the collected kernel events, the kernel events are organized as per-thread (process if not a thread) event sequence ordered by the time when kernel events occur. This can be done based on the context switch kernel events which tell at what time a thread or process is running on a CPU processor, and the original kernel events which include the information on when and on which CPU processor the kernel events occur. After the pre-processing, a 5-tuple event record is generated to present each kernel event <owner ID, time_begin, time_end, event type, event data>:

owner ID—the ID of the event owner, which includes a machine name (for example, the machine IP address), a process ID (thread ID if the event is generated by a thread), and optionally a process name. This describes at which machine and by which process the event is generated.

time_begin—the time when this kernel event starts.

time_end—the time when this kernel event ends.

event type—the kernel event type. Examples include but not limited to network events (e.g., TCP_RECV, TCP_SEND), Inter-Process Communication events (e.g., PIPE_WRITE, PIPE_READ), process events (e.g., PROCESS_CREATE), and system call events. Application program execution events such as entering or exiting an application function can also be collected as kernel events through special logging tools, and special event types such as AP_FUNCTION_ENTER and AP_FUNCTION_EXIT can be defined for those application events.

event data—the extra information associated with kernel event types. Examples include but not limited to network event data (e.g., network flow data <destination IP address, source IP port, destination IP port, packet size> for TCP_RECV and TCP_SEND), Inter-Process Communication event data (e.g., <ID, size> for PIPE_WRITE, PIPE_READ), process event data (e.g., child process ID for PROCESS_CREATE), system call event data (e.g., system call function names such as read, write), and application event data (e.g., function IDs for AP_FUNCTION ENTER and AP_FUNCTION EXIT).

The output of 301 is a set of processes described by owner IDs, and each process has a time-ordered event record sequence where the event records have the same owner ID as the process.

At step 302, define a marking event set, the marking event set consists of request unit marks each presented as a 4-tuple record <begin_event_type, end_event_type, owner, event_data_filter>:

begin_event_type—this defines the event type that the first event of a request unit must exactly match. Examples include but not limited to network event types (e.g., TCP_RECV), Inter-Process Communication event types (e.g., PIPE_WRITE), process event type (e.g., PROCESS_CREATE), system call event types (e.g., KWAKEUP), and application event types (e.g., AP_FUNCTION_ENTER).

end_event_type—this defines the event type that the last event of a request unit must exactly match. Examples include but not limited to network event types (e.g., TCP_SEND), Inter-Process Communication event types (e.g., PIPE_READ), system call event types (e.g., KSLEEP), and application event types (e.g., AP_FUNCTION_EXIT).

owner_filter—this defines the owner ID that the first and last events of a request unit must (partially or exactly) match. Examples include but not limited to a specific process name (e.g., httpd), a specific process ID (e.g., 5000), or a wild card (*, which matches any owner ID).

event_datat_filter—this defines the event data that the first and last events of a request unit must (partially or exactly) match. Examples include but not limited to network event data (e.g., [source IP port=80] for TCP_RECV and TCP_SEND), Inter-Process Communication event data (e.g., a wild card [ID=*] for PIPE_WRITE and PIPE_READ), and application event data (e.g., [Function ID=1000] for AP_FUNCTION_ENTER and AP_FUNCTION_EXIT). A wild card in this fields matches any event data. The event data filters can be different for the first and last events.

The output of 302 is a set of request unit marks which will be used to detect the begins and ends of request units in the event record sequences of 301. The request unit marks can be predefined as a default set, or dynamically configured upon user requests.

At step 303, slice request units, one request unit (RU) is defined through a time-ordered event sequence data structure <S>, where S is an event record subsequence of one process.

FIG. 3 shows the flowchart for the slicing algorithm to generate transaction units from the per-process kernel event traces. In the slicing procedure, we keep track of two types of transaction units: open transaction units which have the beginnings detected but not found the endings yet, and complete transaction units which have both the beginnings and the endings detected. The slicing algorithm scans one event after another in a process's event sequence, checks the event with event marks on the begin event type and end event type, creates a new open transaction unit if its first beginning event is detected, and closes a open transaction unit as a complete one when its ending event is detected.

Following is the slicing procedure to generate request units from the collected kernel event traces in 301 (called E) using the marking event set in 302 (called M):

303.a—initialize an empty request unit set $RU_{global}$;
303.b—for each process/thread p in M, repeat the following steps;
    303.b.1—initialize two empty request unit sets $RU_{complete}$ and $RU_{active}$;
    303.b.1—start from the first event record of p's event record sequence $E_p$, and call it $e_c$ in the following;
    303.b.2—for each request unit mark $M_i$ in M,
        303.b.2.1—check if its owner filter matches p's owner ID;
        303.b.2.2—if not matched, go back to 303.b.2 for the next request unit mark;
        303.b.2.3—if matched, check if the begin_event_type in $M_i$ matches $e_c$'s event type and event_data_filter in $M_i$ matches $e_c$'s event data;
            303.b.2.3.1—if both are matched, check if any RU R in $RU_{active}$ has the first event record in its event record sequence S matching the begin_event_type and event_data_filter in $M_i$;
                303.b.2.3.1.1—if yes, check if R has any event record in its event record sequence S matching the end_event_type and event_data_filter in $M_i$;
                    303.b.2.3.1.1.1—if yes, assign $e_R$ the last such event record, and check if the time different (time_begin($e_c$)−time_begin($e_R$))>A, a configurable time threshold;
                        303.b.2.3.1.1.1.1—if yes, first move R from $RU_{active}$ into $RU_{complete}$; then, create a new request unit N in $RU_{active}$, insert $e_c$ as the first event record in N's event record sequence S, and insert $M_i$ as the first mark in N's request unit mark set; and go to 303.b.3;
                        303.b.2.3.1.1.1.2—if no, append $e_c$ at the end of R's event record sequence; and go to 303.b.3;
                  303.b.2.3.1.1.2—if no, create a new request unit N in $RU_{active}$, insert $e_c$ as the first event record in N's event record sequence S, and insert $M_i$ as the first mark in N's request unit mark set; and go to 303.b.3
                303.b.2.3.1.2—if no, create a new request unit N in $RU_{active}$, insert $e_c$ as the first event record in N's event record sequence S, and insert $M_i$ as the first mark in N's request unit mark set; and go to 303.b.2.4;
            303.b.2.3.2—otherwise, go to 303.b.2.4;
        303.b.2.4—check if the end_event_type in $M_i$ matches $e_c$'s event type and event_data_filter in $M_i$ matches $e_c$'s event data;
            303.b.2.4.1—if both are matched, check if any RU R in $RU_{active}$ has the first event record in its event record sequence S matching the begin_event_type and event_data_filter in $M_i$;
                303.b.2.4.1.1—if yes, append $e_c$ at the end of R's event record sequence if it has no duplicate copy in the sequence, and go to 303.b.3;
                303.b.2.4.1.2—if no, go to 303.b.2.5;
            303.b.2.4.1—otherwise, go to 303.b.2.5;
        303.b.2.5—append event $e_c$ at the end of each event record sequence of all RUs in $RU_{active}$;
    303.b.3—assign $e_c$ as the next event record in $E_p$, and go back to 303.b.2 until the end of $E_p$;
    303.b.4—if $RU_{active}$ is not empty, copy into $RU_{complete}$ all the RU in $RU_{active}$ whose last event record matches,
    303.b.5—if $RU_{complete}$ is not empty, copy all RUs in it into $RU_{global}$;
303.c—output the RUs in $RU_{global}$ as the detected request units.

In this invention, one full-path request is defined through the composition of multiple request units. FIG. 4 shows the details of the CLUE end-to-end request sequencing procedure as follows:

401. Define a causality relationship set. The causality relationship set consists of event association rules each presented as a 5-tuple record CR: <causing_event_type, caused_event_type, time_rule, owner_rule, event_data_rule>:

causing_event_type—this defines the type of events that can cause the occurrence of other events. Examples include but not limited to network event types (e.g., TCP_SENCV), Inter-Process Communication event types (e.g., PIPE_WRITE), process event type (e.g., PROCESS_CREATE), system call event types (e.g., KWAKEUP), and application event types (e.g., AP_FUNCTION_ENTER).

caused_event_type—this defines the type of events that are caused by other events. Examples include but not limited to network event types (e.g., TCP_RECV), Inter-Process Communication event types (e.g., PIPE_READ), system call event types (e.g., KSLEEP), and application event types (e.g., AP_FUNCTION_EXIT).

time_rule—this defines the rule that a causing event type event and a caused_event_type event can be associated based on their temporal relationships. Examples include but not limited to overlap temporal relationship (e.g., time_begin(causing_event)<time_begin(caused_event) AND time_end(causing_event)>time_begin(caused_event)), nested temporal relationship (e.g., time_begin(causing_event)<time_begin(caused_event) AND time_end(causing_event)>time_end(caused_event)), and disjoint temporal relationship (e.g., time_end(causing_event)<time_begin(caused_event)).

owner_rule—this defines the rule that a causing_event_type event and a caused_event_type event can be associated based on their owner IDs. Examples include but not limited to a specific machine name (e.g., causing_event_owner_machineName==srcIPaddress(caused_event_data)), a specific process name (e.g., causing_event_owner_processName==httpd), a specific process ID (e.g., caused_event_owner_processID==causing_event_owner_processID), or a wild card (*, which matches any owner ID).

event_data_rule—this defines the rule that a causing_event_type event and a caused_event_type event can be associated based on their event data. Examples include but not limited to network event data (e.g., dstIPport(caused_event_data)==srcIPport(causing_event_data)), Inter-Process Communication event data (e.g., PIPE_ID(caused_event_data)==PIPE_ID(causing_event_data)), and application event data (e.g., Function_ID(caused_event_data)==Function_ID(causing_event_data)). A wild card in this field matches any event data.

A rule is called time-causality rule if owner_rule requires both causing and caused transaction units to be from the same process, and their causality relationship is decided by the time_rule. Rules matching transaction units from different processes are called event-causality rules.

For each request unit mark M, a rule pair CRP:($CR_{begin}$, $CR_{end}$) is defined so that the begin_event_type in M uses $CR_{begin}$ to find the associated events in other request units, and the end_event_type in M uses $CR_{end}$ to find the associated events in other request units. Either rule can be empty.

The output of 401 is a set of event association rule pairs which will be used to detect the set of relevant request units and compose full-path requests. The event association rules can be predefined as a default set, or dynamically configured upon user requests.

402. Sequence request units. One request (R) is defined through a two-item data structure <E, C>, where E is a set of request units (RUs), and C is a set of relationships describing the causality between the RUs in E.

FIG. 5 shows the flowchart for the sequencing algorithm to generate full-path transactions from sliced transaction units. In the sequencing process, there are two main procedures: (1) for each transaction unit, search for the transaction units causing it, either in other processes due to certain event-causality rules, or in its own process due to time-causality rules; (2) after the search, construct a full-path transaction for each transaction unit with no causing transaction unit found; the transaction is rooted at that transaction unit, and expanded over all transaction units caused by that root in one hop or multiple hops.

Following is the sequencing algorithm to generate requests from the request unit set U output by 303 using the event association rule pair set AS output by 401:

402.a—initialize an empty request set $RS_{global}$;

402.b—for each request unit $u_i$ in U, repeat the following steps;

402.b.1—initialize two empty request unit sets $RU_i^{parent}$ and $RU_i^{child}$;

402.b.2—For the first event record $e^i_f$ of $u_i$'s event record sequence,

402.b.2.1—for each rule pair $p_x$ in AS;

402.b.2.1.1—if the event type of $e^i_f$ is the caused_event_type of rule $CR_{begin}$ in $p_x$, and $CR_{begin}$ is a time-causality rule, then check if there is any request unit $u_j$ in U who has the same owner as $u_i$ and whose first event record $d^j_f$ can be associated with $e^i_f$ by testing the rule $CR_{begin}$ on $e^i_f$ and $e^j_f$. That is, if the time data of $e^i_f$ and $e^j_f$ can yield TRUE on the rule time_rule in $CR_{begin}$. If yes, go to 402.b.2.1.1.1.

402.b.2.1.2—if the event type of $e^i_f$ is the caused_event_type of rule $CR_{begin}$ in $p_x$, and $CR_{begin}$ is not a time-causality rule, check if there is any request unit $u_j$ in U whose first event record $e^j_f$ can be associated with $e^i_f$ by testing the rule $CR_{begin}$ on $e^i_f$ and $e^j_f$. That is, if the event type of $e^j_f$ is the causing_event_type of rule $CR_{begin}$, and the time, owner IDs, event data of $e^i_f$ and $e^j_f$ can yield TRUE on the rules time_rule, owner_rule, and event_data_rule in $CR_{begin}$.

402.b.2.1.1.1—if $CR_{begin}$ is satisfied, check if the last event record $e^i_l$ in $U_i$ can be associated with the last event record $e^j_l$ in $u_j$ by testing the rule $CR_{end}$ on $e^i_l$ and $e^j_l$;

402.b.2.1.1.1.1—if yes, $u_i$ finds a causing event unit $u_j$; $u_i$ puts $u_j$ in $RU_i^{parent}$, and $u_j$ puts $u_i$ in $RU_i^{child}$; go back to 402.b.2.1;

402.b.2.1.1.1.2—otherwise, go back to 402.b.2.1;

402.b.2.1.1.2—otherwise, go back to 402.b.2.1;

402.b.2.1.2—go back to 402.b.2.1;

402.c—for each request unit $u_i$ in U, repeat the following steps;

402.c.1—if $RU_i^{parent}$ is not empty, $u_i$ is not the heading request unit in a full-path request; go back to 402.c for the next request unit;

402.c.2—otherwise, create a new request $R_x$: <$E_x$, $C_x$>, insert $u_i$ into $E_x$, and insert the relation "NULL->parent($u_i$)" into $C_x$;

402.c.3—for each request unit $u_j$ in $RU_i^{child}$,

402.c.3.1—if both $u_i$ and $u_j$ have only one event in their event sequence, insert into $u_j$ all the events which belong to the same owner of $u_j$ and have the time_begin value larger than time_begin value of $u_i$'s single event and smaller than time_begin value of $u_j$'s single event;

402.c.3.2—insert $u_j$ into $E_x$, and insert the relation "u, ->parent($u_j$)" into $C_x$;

402.c.3.3—insert each request unit $u_k$ in $RU_{jchild}$ into $RU_i^{child}$, and insert the relation "$u_j$->parent($u_k$)" into $C_x$;

402.c.3.4—remove $u_j$ from $RU_i^{child}$;

402.c.3.5—go back to 402.c.3 for the next request unit in $RU_i^{child}$;

402.c.4—insert $R_x$ into $RS_{global}$;

403. Output requests. output the requests in $RS_{global}$ as the detected requests.

From the foregoing, it can be appreciated that the present invention provides a general solution for precise request processing path discovery for distributed applications, as it is agnostic to the application or the middleware platform in the target system. Also, the present invention enables flexible user-defined transaction profiling through dynamic configuration on marking event sets.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for request profiling in service systems with kernel events, comprising the steps of:
   collecting kernel events traces from a target system, said kernel event traces obtainable from individual service machines by instrumenting core kernel functions;
   analyzing kernel event traces for constructing end-to-end request profiling traces consisting of kernel events belonging to service processes; and
   categorizing request traces responsive to said analyzing step, said constructing including grouping requests based on marking kernel events used in said analyzing step;
   wherein said end-to-end request profiling comprises:
   generating request units from collected kernel events based on a configurable marking event set; and
   constructing full-path request traces by composing relevant requests units based on a causality relationship set which is between request units and defined on the marking event set and temporal relationships,
   wherein said step of constructing full-path requests comprises defining a causality relationship set including event association rules each presented as a 5 tuple record: causing event type, caused event type, time rule, owner rule and event data rule.

2. The method of claim 1, wherein said service processes include one of being distributed over multiple machines, residing on the same machine, and belonging to same processes such as a series of threads executing a single request.

3. The of claim 1, wherein said begin event type comprises defining the event type that the first event of a request unit must exactly match, examples of said begin event type, including but not limited to, are network event types, inter-process communication event types, process event type, system call event types, and application event types.

4. The method of claim 3, wherein said owner filter comprises defining the owner ID that the first and last events of a request unit must partially or exactly match, examples of said owner filter, including but not limited to, are a specific process name, a specific process ID, or a wild card matching any owner ID.

5. The of claim 1, wherein said end event type comprises defining the event type that the last event of a request unit must exactly match, examples of said end event type, including but not limited to, are network event types, inter-process communication event types, system call event types, and application event types.

6. The of claim 1, wherein said event data filter comprises defining the event data that the first and last events of a request unit must partially or exactly match, examples of said event data filter, including but not limited to, are a network event, inter-process communication event data, and application event data, a wild card in these fields matching any event data and the event data filters can be different for the first and last events.

7. The of claim 1, wherein said step of generating request units comprises a request unit slicing process where one request unit is defined through a time ordered event sequence data structure that is an event record subsequence of one process, said request unit slicing comprising:
   generating transaction units from per-process kernel event traces;
   keeping track of open transaction units and complete transaction units, said open transaction units having beginnings detected but not found in endings yet and complete transaction units having both beginnings and endings detected;
   scanning one event after another in a process's event sequence;
   checking the event with event marks on a begin event type and an end event type;
   creating a new open transaction unit if its first beginning event is detected; and
   closing an open transaction unit as a complete one when its ending event is detected.

8. The of claim 1, wherein said step of constructing full path requests includes a request unit sequencing procedure comprising for each transaction unit, searching for the transaction units causing it, either in other processes due to certain event-causality rules, or in its own process due to time-causality rules; and after said searching, constructing a full-path transaction for each transaction unit with no causing transaction unit found; the transaction being rooted at said transaction unit, and expanded over all transaction units caused by that root in one hop or multiple hops.

9. The method of claim 8, wherein said causing event type comprises defining the type of events that can cause the occurrence of other events, said caused event type comprises defining the type of events that are caused by other events, said time rule comprises defining a rule that a causing event type event and a caused event type event can be associated based on their temporal relationships, said owner rule comprises defining a rule that a causing event type event and a caused event type event can be associated based on their owner IDs; and said event data rule comprises defining a rule that a causing event type event and a caused event type event can be associated based on their event data.

10. A non-transitory storage medium containing instructions for a computer for carrying out the steps comprising:
    collecting kernel events traces from a target system, said kernel event traces obtainable from individual service machines by instrumenting core kernel functions;
    analyzing kernel event traces for constructing end-to-end request profiling traces consisting of kernel events belonging to service processes; and
    categorizing request traces responsive to said end-to-end request profiling, said constructing including grouping requests based on marking kernel events used in said end-to-end request profiling;
    wherein said analyzing comprises:
    generating request units from collected kernel events based on a configurable marking event set; and
    constructing full-path request traces by composing relevant requests units based on a causality relationship set which is between request units and defined on the marking event set and temporal relationships;

wherein said generating comprises a defined marking event set comprising:

presenting request unit marks as a 4-tuple record: begin event type, end event type, owner filter and event data filter; and providing a set of request unit marks used to detect begins and ends of request units in event record sequences, said request unit marks being predefinable as a default set or dynamically configured upon user requests.

11. The non-transitory storage medium of claim 10, wherein said begin event type comprises defining the event type that the first event of a request unit must exactly match, examples of said begin event type, including but not limited to, are network event types, inter-process communication event types, process event type, system call event types, and application event types.

12. The non-transitory storage medium of claim 10, wherein said end event type comprises defining the event type that the last event of a request unit must exactly match, examples of said end event type, including but not limited to, are network event types, inter-process communication event types, system call event types, and application event types.

13. The non-transitory storage medium of claim 10, wherein said owner filter comprises defining the owner ID that the first and last events of a request unit must partially or exactly match, examples of said owner filter, including but not limited to, are a specific process name, a specific process ID, or a wild card matching any owner ID.

14. The non-transitory storage medium of claim 10, wherein said event data filter comprises defining the event data that the first and last events of a request unit must partially or exactly match, examples of said event data filter, including but not limited to, are a network event, inter-process communication event data, and application event data, a wild card in these fields matching any event data and the event data filters can be different for the first and last events.

15. The non-transitory storage medium of claim 10, wherein said step of generating comprises a request unit slicing process where one request unit is defined through a time ordered event sequence data structure that is an event record subsequence of one process, said request unit slicing comprising:

generating transaction units from per-process kernel event traces;

keeping track of open transaction units and complete transaction units, said open transaction units having beginnings detected but not found in endings yet and complete transaction units having both beginnings and endings detected;

scanning one event after another in a process's event sequence;

checking the event with event marks on a begin event type and an end event type;

creating a new open transaction unit if its first beginning event is detected; and closing an open transaction unit as a complete one when its ending event is detected.

16. A method for request profiling in service systems with kernel events, comprising the steps of:

collecting kernel events traces from a target system, said kernel event traces obtainable from individual service machines by instrumenting core kernel functions;

analyzing kernel event traces for constructing end-to-end request profiling traces consisting of kernel events belonging to service processes; and categorizing request traces responsive to said analyzing step, said constructing including grouping requests based on marking kernel events used in said analyzing step;

wherein said end-to-end request profiling comprises:

generating request units from collected kernel events based on a configurable marking event set; and constructing full-path request traces by composing relevant requests units based on a causality relationship set which is between request units and defined on the marking event set and temporal relationships.

wherein said step of generating request units comprises:

presenting request unit marks as a 4-tuple record: begin event type, end event type, owner filter and event data filter; and providing a set of request unit marks used to detect begins and ends of request units in event record sequences, said request unit marks being predefinable as a default set or dynamically configured upon user requests.

* * * * *